(12) United States Patent
Molen et al.

(10) Patent No.: US 8,255,681 B2
(45) Date of Patent: Aug. 28, 2012

(54) SECURITY FOR MOBILE DEVICES IN A WIRELESS NETWORK

(75) Inventors: Brett Thomas Molen, West Jordan, UT (US); Jan M. DeHoop, Sandy, UT (US); Nichol Fife Draper, West Jordan, UT (US); Richard L. Ehlers, Park City, UT (US)

(73) Assignee: Ibahn General Holdings Corporation, Salt Lake City, UT (US)

( * ) Notice: Subject to any disclaimer, the term of this patent is extended or adjusted under 35 U.S.C. 154(b) by 1487 days.

(21) Appl. No.: 11/079,020

(22) Filed: Mar. 10, 2005

(65) Prior Publication Data

US 2006/0206933 A1   Sep. 14, 2006

(51) Int. Cl.
 H04L 29/06    (2006.01)
(52) U.S. Cl. .......................................... 713/153; 726/12
(58) Field of Classification Search .................. 713/153, 713/154, 151, 152, 160, 161, 162; 726/11, 726/12, 13, 14, 15, 23, 30
See application file for complete search history.

(56) References Cited

U.S. PATENT DOCUMENTS

| | | | |
|---|---|---|---|
| 7,007,080 B2 * | 2/2006 | Wilson ........................... | 709/221 |
| 7,142,851 B2 * | 11/2006 | Zhang et al. ................. | 455/426.2 |
| 7,260,638 B2 * | 8/2007 | Crosbie ......................... | 709/229 |
| 2002/0032855 A1 * | 3/2002 | Neves et al. ................... | 713/154 |
| 2003/0087629 A1 * | 5/2003 | Juitt et al. ...................... | 455/411 |
| 2004/0008680 A1 * | 1/2004 | Moss et al. ..................... | 370/390 |
| 2004/0090972 A1 * | 5/2004 | Barrett et al. .................. | 370/401 |
| 2004/0123150 A1 * | 6/2004 | Wright et al. .................. | 713/201 |
| 2004/0221154 A1 | 11/2004 | Aggarwal | |
| 2005/0149757 A1 * | 7/2005 | Corbett et al. ................ | 713/201 |
| 2006/0068799 A1 * | 3/2006 | Morton et al. ................ | 455/450 |
| 2006/0177063 A1 * | 8/2006 | Conway et al. ............... | 380/270 |

FOREIGN PATENT DOCUMENTS

WO    PCT/US06/08597    3/2006

OTHER PUBLICATIONS

Preliminary Examination Report dated Nov. 22, 2007 issued in PCT/US06/08597.
International Search Report and Written Opinion dated Oct. 22, 2007 issued in PCT/US06/08597.

* cited by examiner

*Primary Examiner* — Gilberto Barron, Jr.
*Assistant Examiner* — Izunna Okeke
(74) *Attorney, Agent, or Firm* — Weaver Austin Villeneuve and Sampson LLP

(57) ABSTRACT

A network and associated methods and apparatus are described. The network includes a wireless access node which is operable to receive first packets from a plurality of wireless computing devices attempting to access the network. Each of the first packets corresponds to one of a plurality of traffic types. At least one of the traffic types corresponds to an encrypted wireless protocol. The wireless access node is configured to associate one of a plurality of identifiers with each of the first packets. Each of the plurality of identifiers corresponds to one of the plurality of traffic types. The wireless access node is further configured to transmit all first packets received from the wireless computing devices to a gateway on the network regardless of destination addresses associated with the first packets. The gateway is operable to determine that a particular one of the first packets from a first one of the wireless computing devices is directed to a second computing device on the network. The gateway is further operable to prevent the particular first packet from reaching the second computing device in response to determining that the particular first packet is directed to the second computing device.

20 Claims, 4 Drawing Sheets

Property

SECURITY FOR MOBILE DEVICES IN A WIRELESS NETWORK

BACKGROUND OF THE INVENTION

The present invention relates to security in wireless networks and, more specifically, to preventing unauthorized access to mobile devices in a wireless network.

When corporate information leaves the office on a laptop computer, the ability of the enterprise to protect that information is seriously diminished, thereby creating serious risks. Many of the laptops carried by today's business travelers not only contain many gigabytes of valuable company data, but they also bear a set of keys to the enterprise network in the form of remote access credentials. In other words, unauthorized access to a business traveler's laptop provides a wealth of opportunities for data theft, data corruption, industrial espionage, identity theft, and network penetration.

In recent years, one particular avenue of attack on mobile corporate data has been broadened, quite literally, by the increasingly widespread availability of broadband network connections at, for example, hotels and conferences. Whenever such access is made available, it quickly becomes very popular with business travelers. Hotels increasingly use the availability of broadband connectivity as an incentive to woo guests in this sector. However, the provision of such connectivity for hotel guests and conference attendees presents several challenges and can create new risks. Unlike the employees or family members who typically share a broadband connection in an office or networked home, most hotel guests are strangers to one another and have no desire to share their data with other guests. Hotels and other providers of wireless "hotspots" must therefore provide shared broadband access to the public Internet while keeping private the connections made within their property. Failure to provide appropriate levels of security for guest connections can have negative consequences far beyond complaints from guests. That is, for example, hotels are obliged to provide reasonable levels of protection for guests and their valuables, and so the probability that insecure data connection systems will be abused creates a potential liability for hotels and other providers of wireless broadband Internet access.

It is therefore desirable to provide techniques for protecting data on mobile devices in wireless networks.

SUMMARY OF THE INVENTION

According to the present invention, an end-to-end network architecture is provided which enables a population of users having diverse machine configurations and connection capabilities to reliably and securely connect to the network and the Internet.

According to a specific embodiment, a network and associated methods and apparatus are provided. The network includes a wireless access node which is operable to receive first packets from a plurality of wireless computing devices attempting to access the network. Each of the first packets corresponds to one of a plurality of traffic types. At least one of the traffic types corresponds to an encrypted wireless protocol. The wireless access node is configured to associate one of a plurality of identifiers with each of the first packets. Each of the plurality of identifiers corresponds to one of the plurality of traffic types. The wireless access node is further configured to transmit all first packets received from the wireless computing devices to a gateway on the network regardless of destination addresses associated with the first packets. The gateway is operable to determine that a particular one of the first packets from a first one of the wireless computing devices is directed to a second computing device on the network. The gateway is further operable to prevent the particular first packet from reaching the second computing device in response to determining that the particular first packet is directed to the second computing device.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Figure 1A:
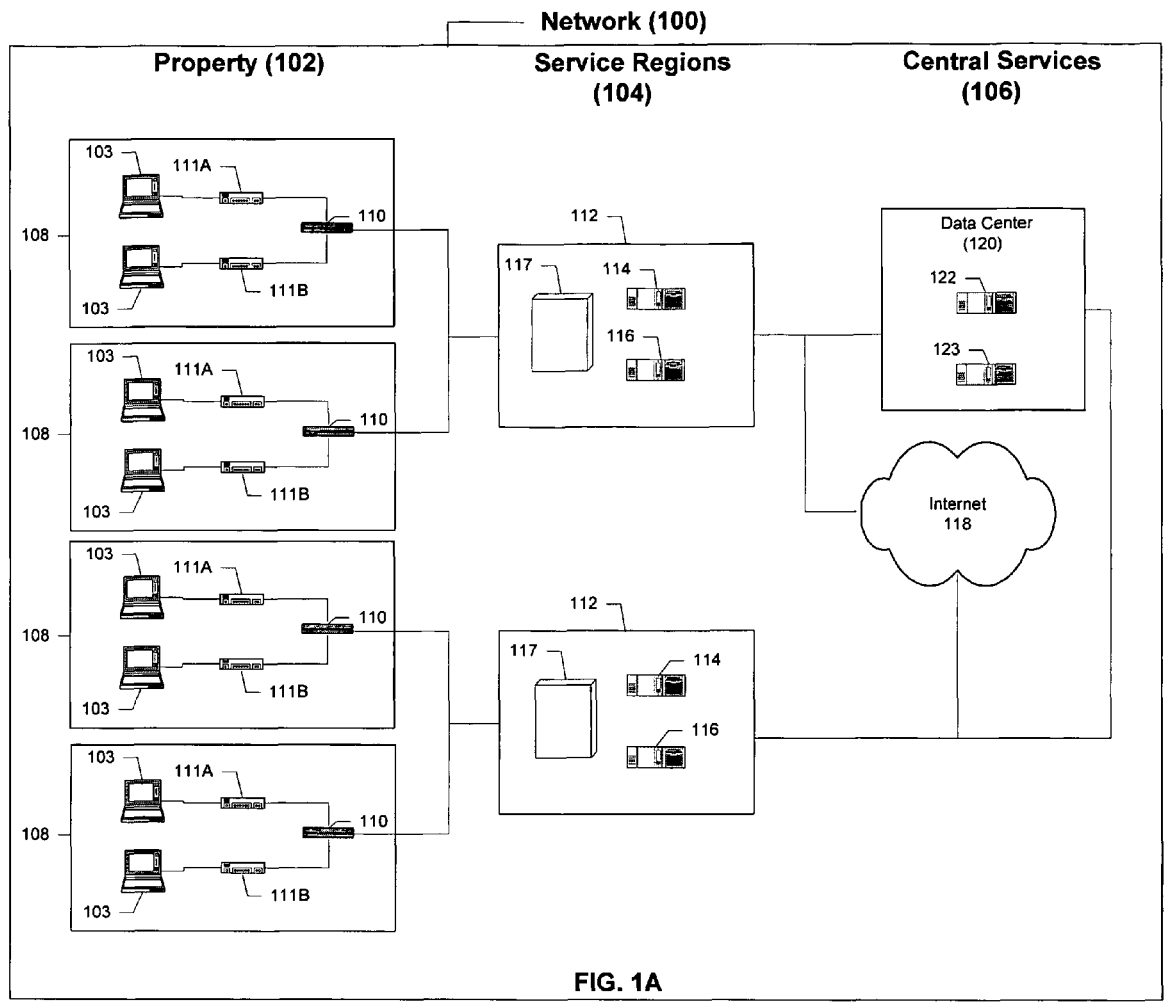
FIG. 1A and FIG. 1B are diagrams of exemplary network environments in which specific embodiments of the present invention may be implemented.

FIG. 1A is a diagram of an exemplary network environment in which specific embodiments of the present invention may be implemented. Network 100 enables an "end-to-end" solution by which mobile devices (e.g., business traveler laptops) may be provided with secure access to the Internet. The following discussion assumes that network 100 is a packet switching network in which the various network devices shown communicate via TCP/IP and associated protocols. It should be noted, however, that network 100 is merely an exemplary environment in which various aspects of the invention may be practiced, and that the details of network 100 should not necessarily be considered as limiting the invention. Rather, it will be understood that many of the basic techniques described herein may be implemented in a wide variety of network environments having only some of the characteristics of network 100 without departing from the scope of the invention.

Network 100 is characterized by a multi-layered architecture which includes three main tiers, i.e., properties 102, service regions 104, and central services 106, all linked by high-speed connections. Properties 102 may be, for example, hotels, conference centers, cafés, and any type of wireless "hotspot." Each property 102 has its own "closed" local network 108 that provides wired and/or wireless access to mobile devices (103) at that property. Such mobile devices may be, for example, laptops or handheld computing devices which are wired and/or wireless. Each local network 108 includes a gateway 110 which secures and manages local broadband traffic. According to various specific embodiments, gateway 110 may comprise, for example, the HEP 502 from STSN of Salt Lake City, Utah, or the USG II from Nomadix of Newbury Park, Calif. Of course, it will be understood that a wide variety of network device types and groups of network devices may be configured to perform the described functionality of such a gateway without departing from the scope of the invention.

To facilitate efficient support, management and security, properties 102 are associated with service regions 104. Each service region 104 features a secure regional point of presence (POP) 112 which may include multiple service region servers 114 and a database 116. When a mobile device at a property 102 accesses the network, the connection is passed through gateway 110 to the appropriate regional POP 112 via a private high-speed circuit (e.g., a T-1, DS-3, OC-3).

Each regional POP 112 has a direct, high-speed connection to the Internet backbone 118. In addition, each POP 112 links to a central data center 120 which enables consolidated reporting, network monitoring, customer service, and quality assurance for all of properties 102. When a device connects to a property network, the equipment and services at each level of network 100 work together to ensure a safe, simple broadband experience that can easily be tracked and supported.

According to various embodiments, gateway 110 may enable both wired and wireless connectivity. For example, such embodiments may support Wi-Fi-based solutions (as represented by wireless access nodes 111A) and DSL, PNA, and Ethernet solutions (as represented by wired access nodes 111B). Gateway 110 facilitates high-speed Internet access from a wide variety of locations at the property. In some embodiments, multiple gateways are installed on a property. For example, in a hotel implementation, one gateway might manage guest rooms while another manages a conference space. Wireless solutions may be implemented according to IEEE 802.11b, 802.11g, 802.11a, 802.16, etc.

Gateway 110 is central to a specialized local area network, i.e., LAN 108. This is a closed, dedicated network for local broadband traffic. LAN 108 provides the infrastructure required for connectivity to the Internet, including any of Customer Premises Equipment (CPE), Digital Subscriber Line Access Multiplexers (DSLAMs), and wireless access points (WAPs). Gateway 110 is intended to be compatible with a broad range of equipment, and the configurations of LANs 108 can vary widely. All hardware devices connected to LAN 108 via wireless access nodes 111A and wired access nodes 111B, including guest mobile devices, are monitored by gateway 110 which regularly reports to its regional POP 112. In this way, broadband service can be monitored, supported, and protected all the way down to individual mobile devices on LANs 108. Wireless access nodes 111A may comprise, for example, the CN320 from Colubris Networks of Waltham, Mass. Wired access nodes 111B may comprise, for example, the Catalyst 2950-24 LRE Switch from Cisco Systems of San Jose, Calif. Of course, it will be understood that a wide variety of devices are suitable for implementing the described functionality.

According to various embodiments, gateway 110 accepts any guest hardware configuration, thus eliminating the necessity for manual configuration and reducing the likelihood of end-users "tweaks" to company mandated laptop configurations which can create holes in security mechanisms.

Gateway 110 may also connect to the property's core network (not shown), e.g., a hotel's network infrastructure. In such implementations, firewall technology and/or intrusion detection and prevention systems (IDS/IPS) may be used to shield the core network from unauthorized intrusions. A router on the core network may be the mechanism by which gateway 110 transfers data to and from its regional POP 112.

As mentioned above, network 100 is divided into geographically-defined service regions 104. Each region 104 includes a secure regional POP 112 which supports multiple properties 102. The traffic to and from a connected property 102 passes through a regional POP 112, thus providing another layer of security, redundancy and quality control.

Regional POPs 112 may include one or a cluster of redundant service region servers (SRS) 114 and regional database 116. Regional POPs 112 may be co-located with third-party ISPs which provides traffic to and from LANs 108 with a direct, high-speed connection to the Internet backbone 118. Enterprise-grade firewalls 117 at POPs 112 protect properties 102 and their guests from hackers, viruses, worms and other malicious attacks. It should be understood that firewalls 117 may be conventional firewalls or, alternatively, include additional functionality such as intrusion detection and intrusion prevention systems (IDS and IPS).

According to the implementation shown in FIG. 1A, regional POPs 112 are linked to central data center 120 which houses the network's central database 122 and services. This combination of multiple regional databases and a single network-wide repository ensures speed and fail-over reliability, while facilitating the delivery of centralized management, reporting and technical support to properties 102. Central data center 120 and regional POPs 112 are enterprise grade, and engineered for maximum security and data availability.

As mentioned above, properties 102 may connect to network 100 via a digital link provided and controlled by the operator of network 100. Alternatively, this connectivity may be achieved using MPLS layered switching technology. In either case, such an approach ensures the highest levels of reliability, security and speed. That is, this private-line connectivity gives properties 102 a single point of contact which is provisioned, installed, supported, and managed by the network provider.

The "end-to-end" architecture shown in FIG. 1A is characterized by a number of advantages. For example, broadband Internet connectivity for disparate devices may be provided in a matter of seconds because of the "plug-and-play" nature of the network. Straightforward connectivity may also be provided in such an environment by providing, for example, robust support for virtual private networks, i.e., VPNs (described below).

As will be described, network 100 automatically assigns each guest device a private IP address from a pool of private IP addresses. This may be done without requiring the release of any pre-assigned "static" IP on the laptop. Each connected device may therefore be identified on the network by two private IP addresses, i.e., the static address assigned by the guest's corporate network and the temporary address assigned by network 100. The use of private IP addresses in this context provides significant security benefits in that they are readily distinguishable from public IP addresses, and are therefore more amenable to preventing unauthorized communications from outside the local network.

When necessary, network 100 can enable guests to access the Internet or a corporate VPN by mapping their device to a public IP address. Network 100 maintains a pool of public IP addresses that can be dynamically assigned anywhere on the network to meet surges or concentrations of guest demand. To connect devices to the Internet, the network performs two network address translations (NATs). The first, performed by gateway 110, maps a device's static IP address to the private IP address assigned by network 100. The second, which may, for example, be performed at firewall/IDS/IPS 117, maps the assigned private IP address to a public IP address. This double translation provides another layer of protection for guest computers. Network 100 also provides Address Resolution Protocol (ARP) control which enables every connected device to be identified by its unique machine Media Access Control (MAC) address for controlling or limiting unauthorized ARP requests or denial of service (DOS) attacks.

Figure 1B:
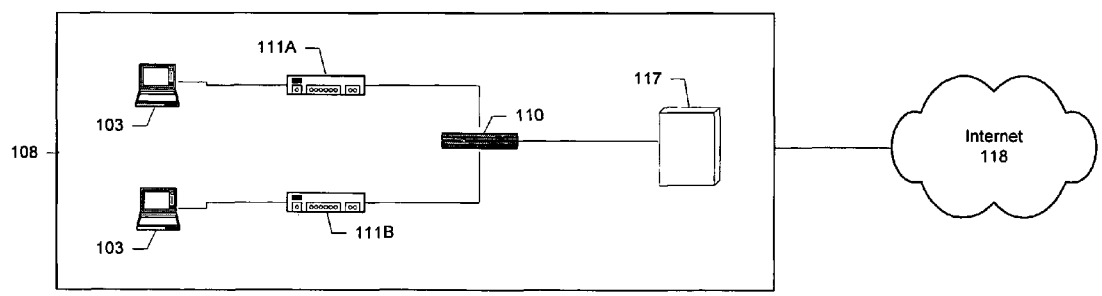

It should be noted that the architecture of network 100 as illustrated and described with reference to FIG. 1A is not the only network architecture in which embodiments of the invention may be practiced. A much simpler (and more common) network environment in which embodiments of the invention may be practiced is illustrated in FIG. 1B. Like reference numerals have been used to indicate like elements with respect to FIG. 1A. The network environment of FIG. 1B could be, for example, a stand-alone property such as a single hotel, an enterprise, or an Internet café. As should be understood, the devices shown in FIG. 1B may be configured to implement many of the same security (and other) functionalities described herein with reference to FIG. 1A.

Figure 2:
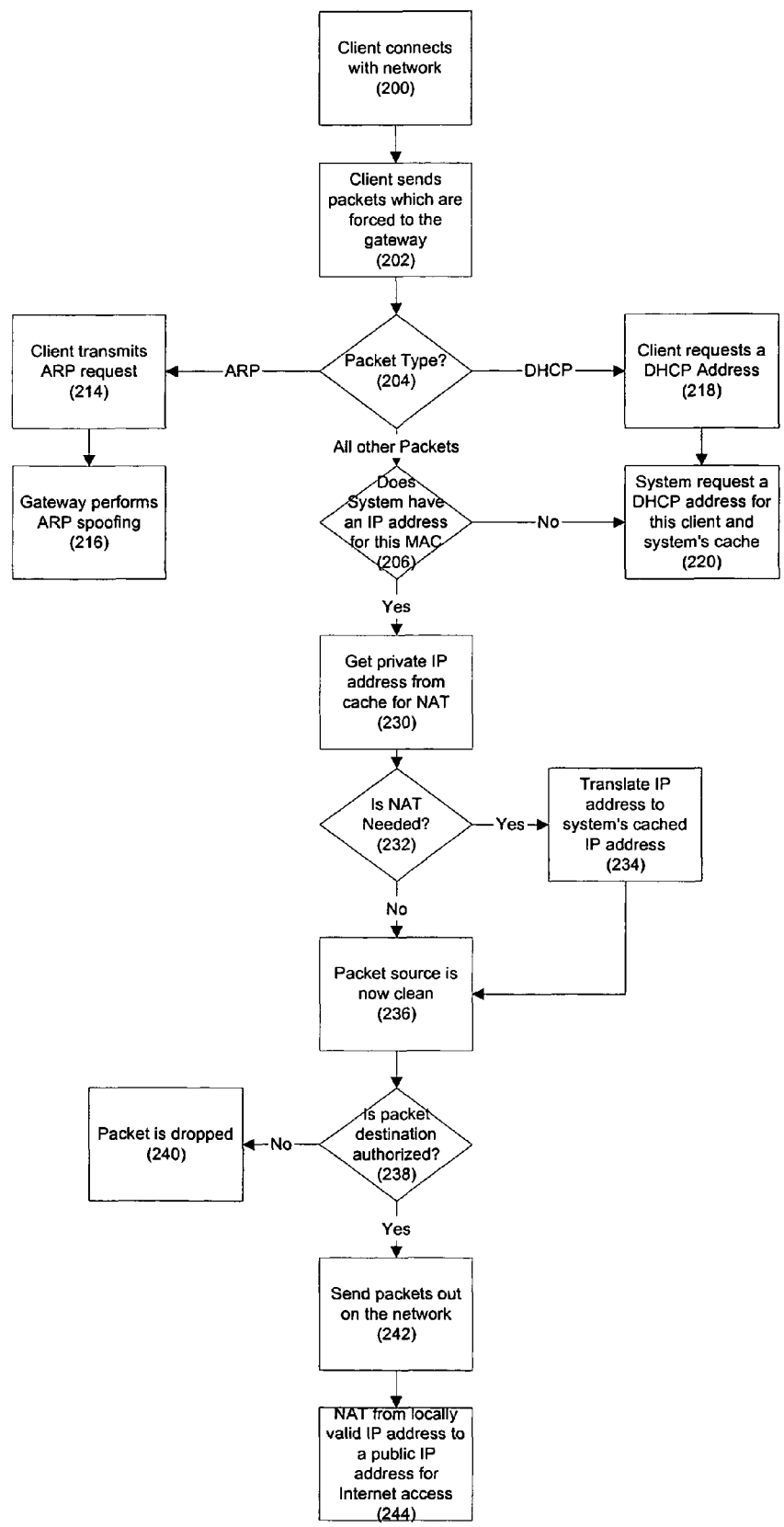
FIG. 2 is a flowchart illustrating a technique by which a client machine may connect with a network designed according to the present invention.

FIG. 2 is a flowchart illustrating part of a session during which a client machine connects with a network such as, for example, those illustrated in FIGS. 1A and 1B. When a client machine connects with the network (200), e.g., by entering a wireless hotspot, it starts sending packets which are forced to the network's gateway (202). If the client machine transmits an ARP request looking for the gateway on its home network (204, 214) and regardless of the client machine's settings the gateway (or an associated network device) performs ARP spoofing (216), returning its own MAC address instead of the requested gateway MAC address. The client machine then starts sending packets to the network device as if it were the requested gateway. Alternatively, if the client machine transmits a DHCP request (204, 218), a DHCP address is requested for the client and placed in the system's cache (220).

The remaining discussion refers to the network device as a gateway like gateway 110 of FIGS. 1A and 1B. It will be understood, however, that at least some of the described functions may be performed by one or more network devices.

For all other packets on the network which are not DHCP or ARP requests (204), the gateway determines whether it has an IP address for the MAC address identified in the packet (206). If not, it requests one for the client and stores it in the system cache (220). If so, the gateway obtains a private IP address which is only valid on the network for network address translation (NAT) (230). If NAT is required (232), the client's IP address is translated to the IP address previously cached for this MAC (234). At this point, whether or not NAT was required, the packet source is considered "clean" (236).

If the packet is addressed to an unauthorized destination on the network (238) it is prevented from reaching the destination, e.g., it is dropped or redirected (240). Otherwise, it is sent out onto the network (242) and, if addressed to a destination outside the network, e.g., the Internet, a NAT is performed translating from the locally valid IP address to a public IP address (244). As described above with reference to FIG. 1A, this second translation, which may, for example, be performed at the firewall/IDS/IPS associated with the corresponding POP 112, provides another layer of protection for guest computers.

Each network access node on the network (e.g., wireless and wired nodes 111A and 111B of FIGS. 1A and 1B), whether it be an Ethernet switch, a WAP, or some other form of access node, has an associated virtual local area network (VLAN) which has an associated unique VLAN Identifier (ID). A VLAN is a collection of network devices which behave as if they are on the same local area network regardless of the underlying hardware. For example, multiple independent VLANs can exist on the hardware infrastructure of a single local area network. Alternatively, a single VLAN can exist across multiple interconnected local area networks.

Packets from each device connected to the network via a network access node are assigned to a VLAN associated with the access node. The corresponding unique VLAN ID is thereafter associated with packets transmitted via that node from the connected device. Such VLANs may be provisioned and the VLAN IDs may be inserted into packet headers according to the IEEE 802.1Q standard approved Dec. 8, 1998, the entirety of which is incorporated herein by reference for all purposes.

By using VLANs and by forcing all traffic to pass through some sort of central monitoring point (e.g., gateway 110 of FIGS. 1A and 1B), networks designed according to the present invention are able to inhibit traffic between access node ports on the network, i.e., traffic between connected devices. For example, if a device connecting via one network access node attempts to send packets to a device connected to the network via another access node, the gateway will recognize the source and destination addresses of those packets as both corresponding to different VLANs on the network and, as a result, prevent the packets from reaching their destinations. This may be accomplished, for example, by dropping the packets or by redirecting them.

Even if a connected device was attempting to send packets to another device on the same VLAN (e.g., another port on the same access node), the packets must still be sent to the gateway. That is, each of the access nodes on the network is configured to always send traffic from connected client devices to the gateway, thus preventing direct port-to-port traffic between ports on the same network access node. As with the node-to-node case described in the preceding paragraph, the gateway will recognize that the packets are originating from and being directed to ports on the same access node. Again, because this type of connection is prohibited, the packets are prevented from reaching their destinations.

Despite the effective security mechanisms described above, mobile devices are often still vulnerable to attacks or snooping from other nearby mobile devices. For example, transmissions to and from a wireless access node may be intercepted or "hijacked" by a transceiver associated with a nearby laptop. Unless those airborne transmissions are encrypted in some way (i.e., they are frequently transmitted in clear text), the information being transmitted, and potentially any information on the connected device, may be readily accessed. Thus, an unprotected wireless link can potentially defeat the security measures described above.

One solution is to require that every device connecting wirelessly to a network employ some form of encryption, e.g., Wired Equivalent Privacy (WEP) or Temporal Key Integrity Protocol (TKIP), to connect with an access node. However, while such an approach may be practicable on an enterprise WAN in which all connecting devices can be appropriately and similarly configured by IT personnel, it is not particularly well suited to more public environments in which a significantly more diverse population of client device configurations is encountered, e.g., wireless hotspots in hotels, conference centers, and cafés. That is, enforcing a particular type of encryption on a diverse population of users could complicate or prevent access by a substantial portion of a customer base, defeating the goal of facilitating universal, seamless access.

Therefore, according to various embodiments of the invention, techniques are provided which enable multiple ways for client machines to connect to a network via the same access node. According to a specific embodiment, network access nodes on a network designed according to the invention have multiple associated VLANs each of which is dedicated to a particular type of traffic. For example, a first VLAN on an access node might be dedicated for Wi-Fi Protected Access (WPA) traffic, a second VLAN on the same access node for Wired Equivalent Privacy (WEP) traffic, a third for voice-over-IP (VoIP) traffic, a fourth for unencrypted traffic, etc. It will be understood that these traffic types are merely exemplary and that provisioning multiple VLANs on a single access node for a wide variety of other types and combinations of traffic is contemplated.

Because each access node is part of multiple VLANs on the network, different 32-bit service set identifiers (SSIDs) are used by different client devices to gain access to the network via the different VLANs depending on the type of traffic they generate. Therefore, a particular access node may employ and recognize one SSID for non-secure wireless traffic, another for WPA traffic, a third for WEP traffic, etc. Thus, according to the invention, a single access node can support low security, unencrypted wireless traffic simultaneously with one or more types of highly secure, encrypted wireless traffic. More generally, multiple ways to connect to the same access point are supported so that a greater diversity of user configurations using both wired and wireless protocols may have access to the network.

As discussed above, the access node is configured to pass all of its incoming traffic to an associated gateway device, thus preventing any direct port-to-port traffic between its ports. The previous example described one embodiment of this methodology that prevents port-to-port traffic through the use of a distinct VLAN on every port. Another embodiment of this methodology would be to use separate physical hardware links. Still another embodiment of this methodology is through disabling port-to-port traffic on each device by the means provided in the device. For example to accomplish this on a Cisco 3500 switch you would issue a port protected command to disable port-to-port traffic. Still another embodiment of this methodology is to configure a proprietary method (either encrypted or not) to send the data directly to the gateway (e.g., a tunnel). For a Colubris wireless access point there is a feature called permit traffic exchange between wireless client stations which may be disabled to stop port-to-port traffic. This is generically referred to as mobile-unit to mobile-unit traffic being disabled. Additionally, the gateway through which all traffic from such an access node is directed is configured to prevent traffic from one VLAN on the network to any other VLAN on the network, thus preventing traffic between any two ports on the network whether the ports are on the same or different access nodes.

Figure 3:
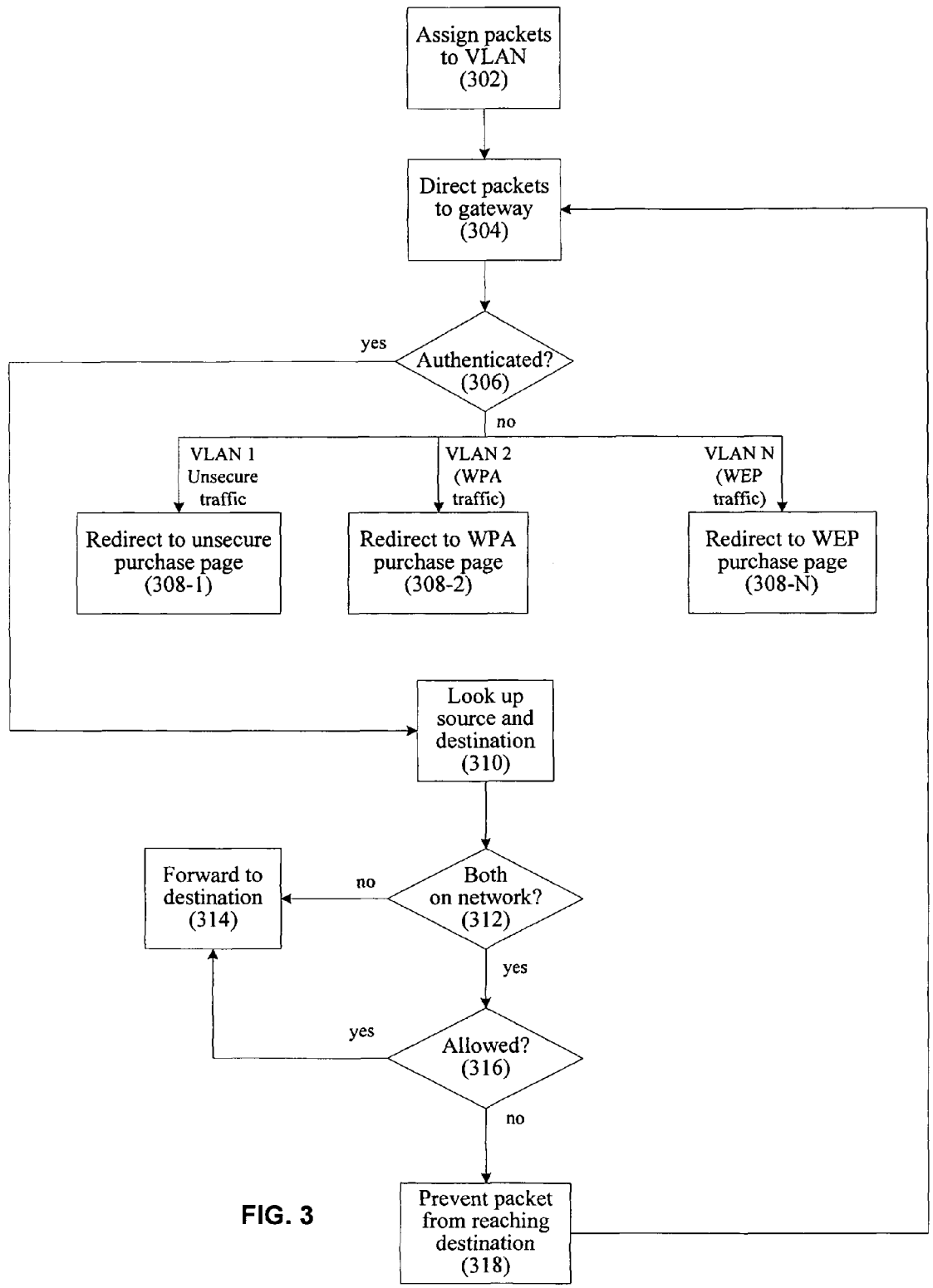
FIG. 3 is a flowchart illustrating a technique for preventing a client machine from accessing other client machines in a network environment according to a specific embodiment of the invention.
Figure 4:
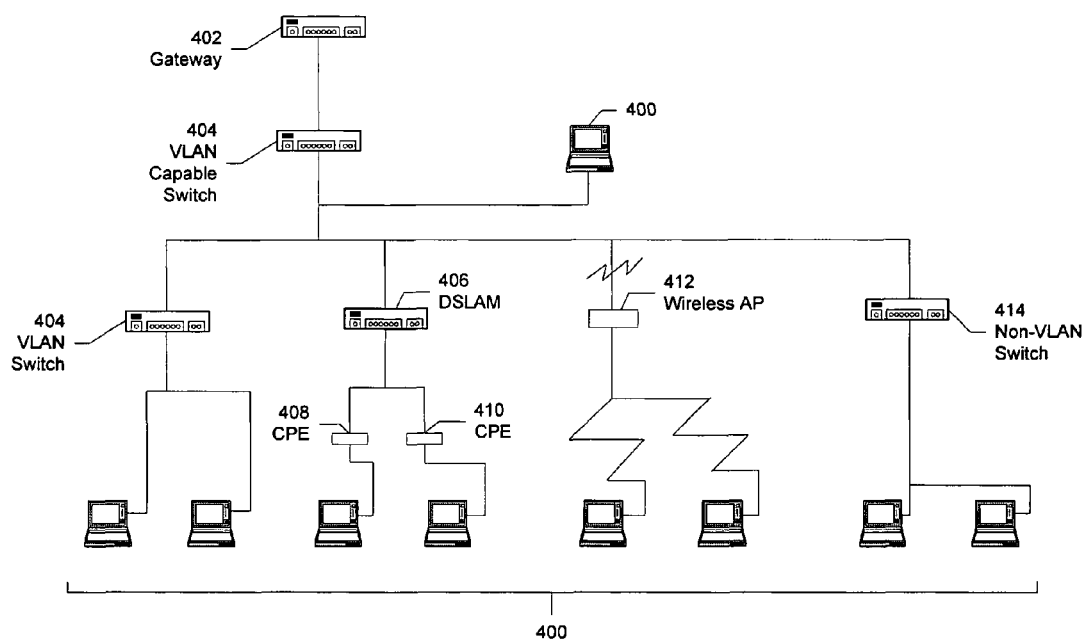
FIG. 4 is another exemplary network diagram for illustrating specific embodiments of the invention.

FIG. 3 is a flowchart and FIG. 4 is a diagram which together serve to illustrate a specific embodiment of a technique by which a gateway (e.g., gateway 110 of FIGS. 1A and 1B) or other suitably configured network device may work with a network access node to prevent traffic between client devices on a network such as network 100 of FIG. 1A. As will be understood, the technique illustrated in FIGS. 3 and 4 may be performed in conjunction with techniques for facilitating access to the network by a particular client device such as, for example, those described above with reference to FIG. 2. In many unsecure networks, each of mobile devices 400 shown in FIG. 4 would normally be able to see broadcast packets and other packets from the other devices on the network. By ensuring that traffic from connected devices is forced to gateway 402, the present invention ensures that the data on each device is secure. Each device 400 is actively authenticated by gateway 402 and communication between devices 400 is regulated by the gateway. VLAN capable switches 404 are configured with VLANs on each port. DSLAM 406 and CPEs 408 and 410 are configured with VLANs if they support them, or port-to-port traffic is disabled in DSLAM 406. Wireless access points 412 are configured to VLAN each SSID's data and mobile-unit to mobile-unit is disabled or multiple access points are used if they are not VLAN capable. Non-VLAN capable switches 414 have port to port traffic disabled.

Referring to FIG. 4, all packets received from connected client devices (e.g., wired and wireless laptops, PDAs, etc.) by a network access node are tunneled to the gateway. The gateway differentiates the packets by the tunnel in which they arrive. As discussed above, each tunnel associates the packet with its entry port into the system. A wide variety of wireless and wired connection protocols may be supported. Examples of the different types of traffic which might have a dedicated tunnel (or the equivalent) include unencrypted, WPA, WPA2, AES, WEP, VoIP, or the traffic associated with a specific corporate entity.

All packets received from client devices by the network access node are assigned to a VLAN (302) and directed to the gateway (304). This may be done, for example, as described above with reference to FIG. 2. According to a specific embodiment, if a client device has not authenticated (306) (as determined, for example, with reference to its MAC address), it is redirected to an authentication page which is specific to the type of traffic generated by that device (308-1 to 308-N). For example, if a device is transmitting using TKIP encryption, the information presented on such a page might be specific to WPA and corresponding options available to that device. Alternatively, the page presented to a device transmitting unencrypted packets might include a warning that the user of the device should not necessarily consider his device secure in that environment.

Once a client machine is authenticated (306), the gateway looks up the source and destination addresses in each packet (310) to determine whether any device on the network is attempting to improperly send packets to any other device on the network. If the source and destination of the packet are not both on the network (312) it is forwarded to the destination address (314) with any suitable NAT or processing as described above with reference to FIG. 2.

If, on the other hand, the source and destination of the packet header are determined to both be on the network (312), the packet may be an unauthorized attempt to communicate with another device on the network. The gateway then determines whether communication between the two devices has been previously authorized (316). If not, the gateway prevents the packet from reaching its destination, e.g., drops or redirects the packet (318). If, on the other hand, the communication has been authorized, the packet is forwarded to the destination (316) subject, of course, to any other appropriate processing (e.g., see FIG. 2).

According to various embodiments, the ability to segregate traffic types (e.g., on different VLANs) enables the gateway to process the different types of traffic in different ways. For example, if a user connects to a wireless access node using unencrypted packets, a message could be presented on the user's machine informing him of more secure wireless options, e.g., WPA. Specific Fortune 500 companies could be assigned their own SSID and VLAN on the network to ensure that their employees are provided access in accordance with agreements with the network operator.

According to other embodiments, VoIP data from VoIP phones can be prioritized on the network over other types of data to ensure reliable voice communication. In addition, traffic from different carriers can be segregated for processing and prioritizing according to individual agreements between the network operator and the carriers.

According to still other embodiments, the ability to segregate traffic on different VLANs allows dynamic security processing to be provided on an individual or group basis. For example, all users associated with a particular company could be assigned to one or more VLANs which are maintained as exclusive to users from that company. Specific security preferences and processing may then be applied to traffic on those VLANs according to previous arrangement with, for example, the IT personnel from the company. In addition, using the VLAN ID and some other attribute by which a user may be uniquely identified on the network (e.g., a MAC address), custom security processing may be provided down to the individual user device level.

A specific example of such security services may be instructive. As is well known, firewalls in public networks often block many of the ports on which web service applications communicate. This is a significant issue for business travelers who increasingly require access to such web services. The end-to-end network architecture of the present invention provides a solution to this problem. That is, by segregating traffic generated by users employed by a particular company, access to particular port numbers may be enabled only for those users. So, for example, an IT professional from a company planning a conference at a conference center may ask that the company's employees be given access to specific ports so that web services will work. Segregating the company's users (e.g., on one or more VLANs) allows the network operator to selectively provide the requested access. In addition, longer term relationships with companies can allow the network operator to maintain this type of information (e.g., a web services profile) ahead of time (e.g., in central database 122 of FIG. 1A). Such profiles could even be maintained down to specific users, roles, etc., within the company.

While the invention has been particularly shown and described with reference to specific embodiments thereof, it will be understood by those skilled in the art that changes in the form and details of the disclosed embodiments may be made without departing from the spirit or scope of the invention. For example, it should be noted that standard VLANs are merely one example of a mechanism which may be employed to prevent traffic between certain devices on a network. That is, any commercially available or proprietary mechanism by which traffic sharing a physical network infrastructure is virtually segregated (including but not limited to those described above) may be employed.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A network, comprising:
    a wireless access node configured to receive first packets from a plurality of wireless computing devices attempting to access the network, each of the first packets corresponding to one of a plurality of traffic types, at least one of the traffic types corresponding to an encrypted wireless protocol, the wireless access node being configured to associate one of a plurality of identifiers with each of the first packets, each of the plurality of identifiers corresponding to one of the plurality of traffic types and one of a plurality of virtual local area networks (VLANs), the wireless access node further being configured to transmit all first packets received from the wireless computing devices to a gateway on the network regardless of destination addresses associated with the first packets;
    the gateway which is configured to determine that one or more of the first packets from a first one of the wireless computing devices are directed to a second one of the wireless computing devices with reference to the identifier associated with the one or more first packets and the identifier associated with the second wireless computing device, the gateway further being configured to prevent the one or more first packets from reaching the second wireless computing device in response to determining that the one or more first packets are directed to the second wireless computing device, thereby inhibiting all packet traffic between different ones of the VLANs on the network and between different devices on a same one of the VLANs on the network.

2. The network of claim 1 wherein at least some of the identifiers comprise service set identifiers (SSIDs) that correspond to the virtual local area networks (VLANs).

3. The network of claim 1 wherein the plurality of traffic types includes Wi-Fi Protected Access (WPA) traffic, WPA2 traffic, AES traffic, WEP traffic, and VoIP traffic.

4. The network of claim 1 wherein the plurality of traffic types includes first traffic corresponding to a specific corporate entity.

5. The network of claim 1 further comprising a wired access node which is configured to receive third packets from a plurality of wired computing devices attempting to access the network, each of the third packets corresponding to one of a second plurality of traffic types each of which corresponds to one of the plurality of identifiers, the wired access node being configured to associate one of the identifiers with each of the third packets, the wired access node further being configured to transmit all third packets received from the wired computing devices to the gateway regardless of destination addresses associated with the third packets.

6. The network of claim 5 wherein the gateway is further configured to determine that one or more of the third packets from one of the wired computing devices are directed to a specific one of the wired and wireless computing devices, the gateway further being configured to prevent the one or more third packets from reaching the specific one of the wired and wireless computing devices in response to determining that the one or more third packets are directed to the specific one of the wired and wireless computing devices.

7. The network of claim 1 further comprising a high-bandwidth connection to the Internet by which the gateway is configured to transmit at least some of the first packets to the Internet, the network further comprising one or more of a firewall, an intrusion detection system, or an intrusion prevention system, each of which is configured to protect the network from external packets from the Internet.

8. The network of claim 7 wherein one or more of the firewall, the intrusion detection system, or the intrusion prevention system is implemented on one of the gateway or an intervening network device on the network.

9. The network of claim 7 wherein at least one device on the network is configured to perform network address translation to facilitate transmission of the first packets to the Internet.

10. The network of claim 1 wherein the gateway is further configured to perform network address translation to facilitate transmission of at least some of the first packets on the network.

11. The network of claim 1 wherein the gateway is further configured to supply locally valid network address to at least some of the wireless computing devices to facilitate transmission of at least some of the first packets on the network.

12. The network of claim 1 wherein the gateway is further configured to process specific packets associated with a first one of the identifiers in accordance with a set of security options.

13. The network of claim 12 wherein the set of security options is determined with reference to input from a user associated with a specific computing device from which at least some of the specific ones of the specific packets originated.

14. The network of claim 13 wherein input from the user is obtained dynamically after the specific computing device connects to the network.

15. The network of claim 13 wherein input from the user is obtained prior to the specific computing device connecting to the network.

16. The network of claim 12 wherein the set of security options is determined with reference to one or both of a type of the specific computing device from which the specific first packets originated or a type of a specific access node by which the specific computing device connected to the network.

17. The network of claim 1 wherein the gateway is further configured to establish a secure connection between at least one of the wireless computing devices and at least one other computing device on the network.

18. The network of claim 17 wherein the gateway is further configured to process packets associated with the secure connection in accordance with a set of security options.

19. The network of claim 18 wherein the gateway is further configured to apply a different subset of the security options to packets originating from each of the computing devices associated with the secure connection.

20. The network of claim 1 wherein the wireless access node is deployed on a property local area network (LAN), the network further comprising a plurality of such property LANs, and a plurality of regional points-of-presence (POPs), each of the regional POPs forming a wide area network (WAN) with a subset of the property LANs and being configured to facilitate secure Internet access via a high-bandwidth connection for the wireless computing devices connected to the associated subset of property LANs, the gateway being deployed either on the property LAN with the wireless access node or on the associated POP, the network further comprising a central services network forming a WAN with all of the regional POPs, the central services network being configured to centrally monitor and manage operation of the regional POPs and the property LANs.

* * * * *